(12) United States Patent
Hans (10) Patent No.: US 7,002,275 B2
(45) Date of Patent: Feb. 21, 2006

(54) ELECTRIC MOTOR, PARTICULARLY AN ELECTRONICALLY COMMUTATED DIRECT CURRENT MOTOR

(75) Inventor: Helmut Hans, Sankt Georgen (DE)

(73) Assignee: Minebea Co., Ltd., (JP)

( * ) Notice: Subject to any disclaimer, the term of this patent is extended or adjusted under 35 U.S.C. 154(b) by 0 days.

(21) Appl. No.: 10/770,692

(22) Filed: Feb. 3, 2004

(65) Prior Publication Data
US 2004/0217665 A1   Nov. 4, 2004

(30) Foreign Application Priority Data
Sep. 25, 2001  (DE) ................................ 101 47 073
Aug. 21, 2002  (WO) ..................... PCT/EP02/09359

(51) Int. Cl.
H02K 21/00 (2006.01)
H02K 1/27 (2006.01)

(52) U.S. Cl. ........................ 310/156.47; 310/156.48; 310/216; 310/254

(58) Field of Classification Search .......... 310/156.47, 310/156.48, 216, 218, 217, 254, 156.35
See application file for complete search history.

(56) References Cited

U.S. PATENT DOCUMENTS

| | | | | |
|---|---|---|---|---|
| 4,739,201 A | * | 4/1988 | Brigham et al. | 310/49 R |
| 5,723,921 A | * | 3/1998 | Sugiura | 310/49 R |
| 5,973,426 A | * | 10/1999 | Fujinaka et al. | 310/49 R |
| 6,042,349 A | | 3/2000 | Ito et al. | 417/423.7 |
| 6,252,323 B1 | * | 6/2001 | Nishikawa et al. | 310/156.01 |
| 6,657,349 B1 | * | 12/2003 | Fukushima | 310/156.47 |
| 6,707,209 B1 | * | 3/2004 | Crapo et al. | 310/156.43 |

FOREIGN PATENT DOCUMENTS

| | | |
|---|---|---|
| EP | 1 087 502 A2 | 3/2001 |
| JP | 02254954 | 10/1990 |
| WO | WO 99/57795 | 11/1999 |

OTHER PUBLICATIONS

Cover page of the published PCT application (WO 03/030332).
German International Search Report dated Apr., 2003.

* cited by examiner

Primary Examiner—Darren Schuberg
Assistant Examiner—Leda T. Pham
(74) Attorney, Agent, or Firm—Schulte Roth & Zabel, LLP; Joel E. Lutzker; John C. Garces (57) ABSTRACT

An electric motor, particularly an electronically commutated direct current motor, has a stator and a rotor. The stator and the rotor are arranged coaxially to a longitudinal axis of the electric motor. The stator features a plurality of electrical stator poles and a plurality of phase windings. The rotor features a permanent magnet with a least one magnetic pole pair which is dedicated to the phase windings. The phase windings and/or the permanent magnet are divided into several axial sections in the direction of the longitudinal axis of the electric motor and these sections are staggered around the longitudinal axis of the electric motor with respect to each other. Angular positions of the individual phases are offset with respect to each other is in such a way that torque ripple can be reduced and torque gaps can be prevented.

10 Claims, 6 Drawing Sheets

FIG. 1

PRIOR ART

# ELECTRIC MOTOR, PARTICULARLY AN ELECTRONICALLY COMMUTATED DIRECT CURRENT MOTOR

CROSS-REFERENCE TO RELATED APPLICATIONS

This Application claims all rights of priority to German Patent Application Serial No. 10147073.8, filed Sep. 25, 2001 (pending), and PCT Application No. PCT/EP02/09359, filed Aug. 21, 2002 (pending).

BACKGROUND

The invention relates to an electric motor, particularly, an electronically commutated direct current motor.

The invention relates to the field of brushless electric motors with permanent magnets and in particular direct current (DC) motors which can be configured as either inner rotor motors or outer rotor motors. Inner rotor motors feature a rotor assembly which includes a rotor shaft and one or more permanent magnets arranged on the rotor shaft as well as a stator assembly which features, for example, a stator composed of plates having phase windings. The rotor assembly is fitted in a coaxial, concentric manner in the stator assembly. In an outer rotor motor, the rotor unit surrounds the stator concentrically.

Figure 1:
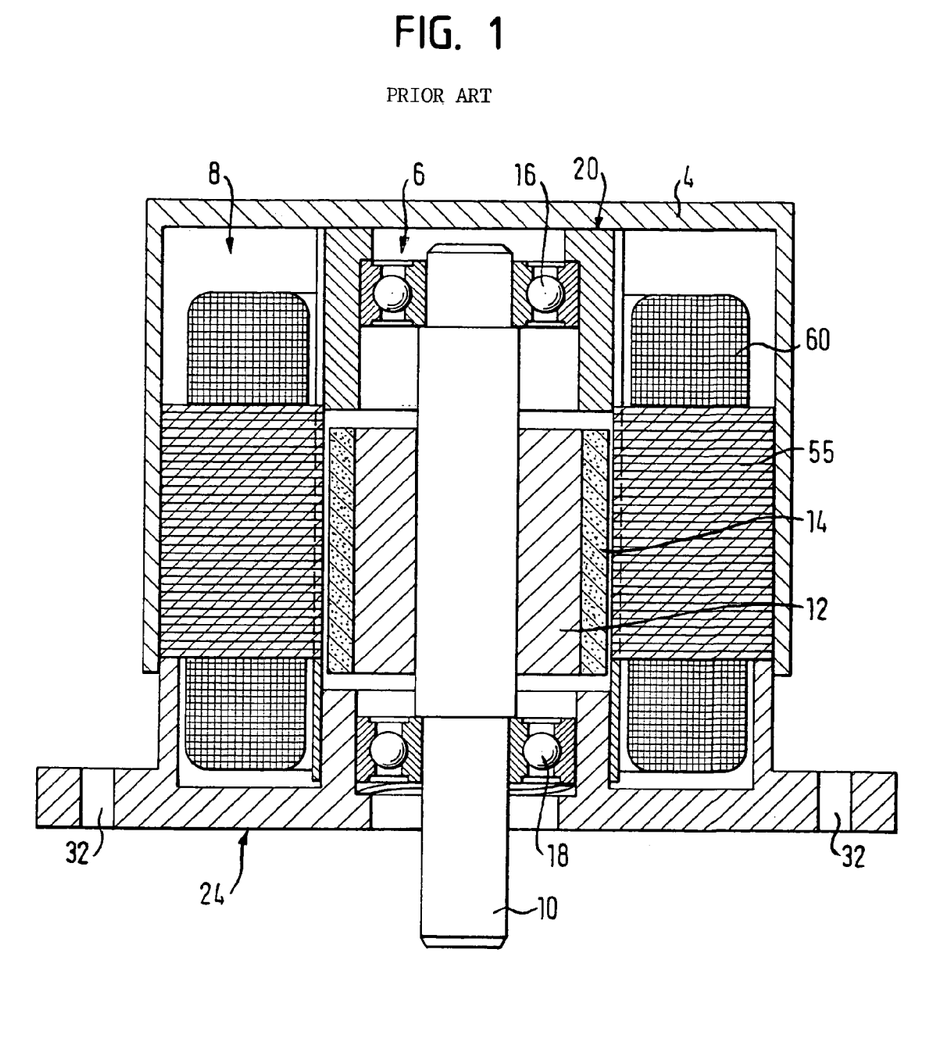
FIG. 1 is a schematic longitudinal section through a DC motor in accordance with the prior art.

FIG. 1 schematically illustrates the basic structure of an inner rotor motor, with a housing 4 which contains the stator assembly 8, the rotor assembly 6 as well as the bearings 16, 18 to rotatably support the rotor assembly. The stator assembly 8 includes stator plates 55 and phase windings 60 and encloses an inner space into which the rotor assembly 6 can be inserted. The bearings 16, 18 for the rotor assembly can, for example, be integrated into flanges 24 or end caps 20 on the motor housing 4.

Figure 2:
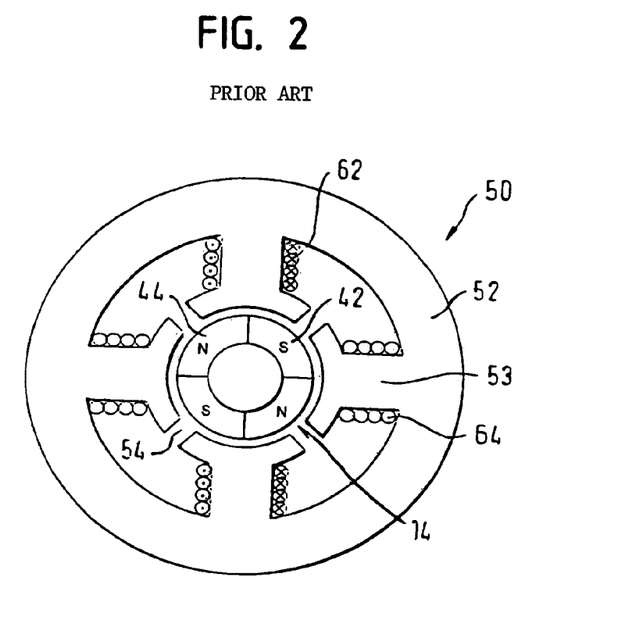
FIG. 2 is a schematic cross-section through a two-phase electric motor with four stator slots and a magnetic pole pair in accordance with the prior art.

FIG. 2 shows a schematic sectional view through an exemplary two-phase DC motor having a stator assembly and a rotor assembly enclosed concentrically by the stator assembly. The stator assembly is illustrated schematically by a stator plate 52 which features four electrical poles 53 and four stator slots 54, whereby two phase windings 62, 64 of the two-phase DC motor are equally distributed between and wound on the electrical poles 53. The electrical poles are also referred to as hammers. The number of electrical poles is determined by the number of hammers or the number of stator slots on the stator assembly. The rotor assembly is illustrated schematically by a permanent magnet 14 with a magnetic pole pair 42, 44.

In the embodiment illustrated the windings 62, 64 of the first phase and those of the second phase lie opposite each other as shown in FIG. 2. Basically, the geometric offset of the phases equals 360 electrical degrees divided by the number of phases and thus in the present embodiment equals 360 electrical degrees/2=180 electrical degrees. The number of windings 62, 64 of one phase is thus equal to the number of stator slots divided by the number of phases.

Figure 3:
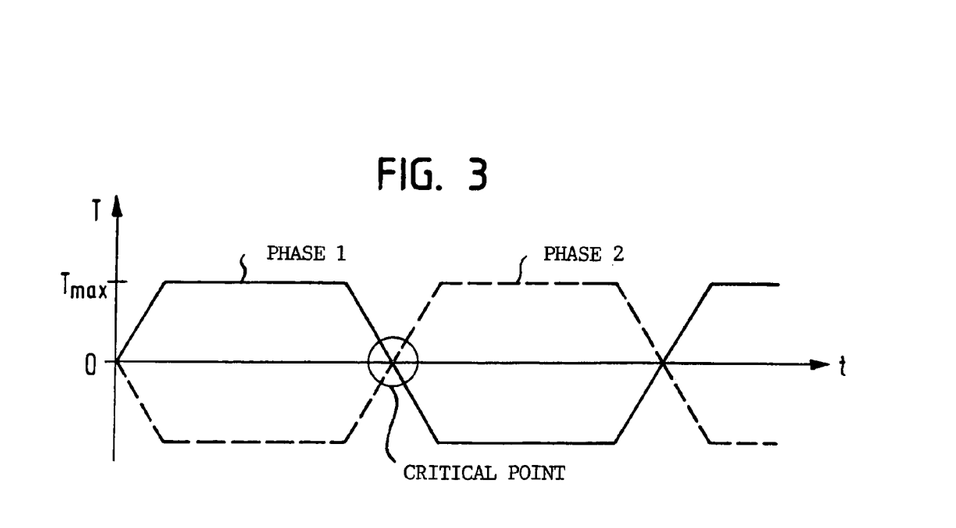
FIG. 3 is a torque profile generated by the motor described in FIG. 2.

The phases of the DC motor according to the embodiment shown in FIG. 2 generate the torque shown in FIG. 3 when constantly energized.

As shown in FIG. 3, there is a rotor position in two-phase DC motors in which torque cannot be generated by either energizing phase 1 or energizing phase 2. This situation is illustrated in FIG. 3 showing the "critical point". The torque T delivered by the two-phase DC motor fluctuates between 0 and a maximum value $T_{max}$. This fluctuation is referred to as "torque ripple", i.e., a ripple created during the energizing process.

FIG. 4 shows a schematic sectional view through a three-phase DC motor with a stator assembly which has six electrical poles 56 and six corresponding stator slots 57 as well as a rotor assembly arranged coaxially in the stator assembly having a permanent magnet 14 with two magnetic pole pairs 46, 48. Corresponding to the three phases of the DC motor, three windings 66, 67, 68 of the first, second and third phase, respectively, are placed in the slots 57 of the stator plate 55, staggered with respect to each other. The number of windings per phase is equal to the number of slots (6) divided by the number of windings (3) and is thus 2. FIG. 5 shows the related torque profile generated by the three-phase DC motor.

As shown in FIG. 5, the geometric offset of the three phases is:

360 electrical degrees/number of phases=120 electrical degrees.

Thus, in the three-phase DC motor, there are no torque gaps and torque fluctuates between a minimum and a maximum torque value $T_{max}$, $T_{min}$, which, however, still causes a certain torque ripple to be created. FIG. 5 also shows that in specific rotor positions ($\Delta t_{10}$, $\Delta t_{20}$, $\Delta t_{30}$), the individual phases do not generate any torque.

U.S. Pat. No. 5,973,426 describes a three-phase electric motor in which the permanent magnet is divided into three axial sections which deviate 120° relative to each other. The purpose of the arrangement described is to disclose a highly efficient small-scale motor. However, this reference does not deal with the problems of torque ripple or torque gaps.

WO 99/57795 describes a motor arrangement having two independent; operable motors on a common shaft. The purpose of this arrangement is to keep the motor operating even during failures in the excitation switch.

In order to reduce the problem of torque ripple and to eliminate cogging torque, it has been suggested in the prior art to provide a rotor with a permanent magnet whose poles are obliquely magnetized to prevent abrupt switching between the individual phases. This oblique magnetization of the rotor poles, however, generates an axial load component and thus a loss of torque.

BRIEF SUMMARY

In one of its aspects, the invention generally discloses an electric motor and particularly an electronically commutated direct current motor which is constructed in such a way that torque ripple can be reduced and torque gaps in the individual phases can be eliminated.

The electric motor presented in the invention has a stator and a rotor which are arranged coaxially to a longitudinal axis of the electric motor. The stator consists of a plurality of electrical stator poles and a plurality of phase windings, and the rotor includes a permanent magnet with at least one magnetic pole pair which is dedicated to the phase windings. In accordance with the invention, the necessity to angularly position the individual phases to each other is overcome in that the phase windings and/or the permanent magnet is divided into several axial sections in the direction of the rotational or longitudinal axis of the electric motor and these sections are staggered around the longitudinal axis of the electric motor in relation to each other.

According to a first preferred embodiment of the invention, the phase windings of the motor are thus not distributed on the stator poles in the circumferential direction of the stator but rather the motor is built up of several stacks each of which bear only one phase winding and which are arranged behind each other in an axial direction. In another embodiment of the invention, the permanent magnet is divided into several axial sections in the direction of the longitudinal axis of the electric motor, whereby each permanent magnet section features at least one magnetic pole pair and the individual sections are staggered around the longitudinal axis of the motor in relation to each other. The geometric offset of the relative positions of the individual motor phases can thus be achieved by dividing the stator into several axial stator sections, each of which represents a phase, and by staggering the stator sections or stacks in relation to each other or by dividing the permanent magnet of the rotor into several axial permanent magnet sections and staggering the permanent magnet sections and thus the magnetic poles of the related sections in relation to each other.

The invention provides that the number of axial stator sections is equal to the number of phase windings so that each stator section features one phase winding. The stator preferably consists of two or three axial sections corresponding to a two-phase or three-phase DC motor. To achieve particularly low torque ripple, the stator sections should be staggered in relation to each other by approximately 180 electrical degrees/(number of phases). The same applies when the permanent magnet is divided into several axial sections rather than the stator.

In the preferred embodiment of the invention, the number of slots or electrical stator poles is equal to the number of magnetic poles in order to achieve the most even torque profile possible.

Dividing the individual phase windings over several axial sections has the added advantage that total electrical separation of the phases is made possible so that no mutual inductance or leakage inductance is created due to the currents which flow through the windings influencing each other, making the motor altogether less susceptible to failure. With suitable phase winding control and an appropriate choice of the phases that determine the torque, it is possible to achieve an essentially smooth torque profile.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which:

FIG. 4 is a schematic cross-section through a three-phase electric motor with six stator slots and two magnetic pole pairs in accordance with the prior art;

FIG. 5 is a torque profile generated by the motor described in FIG. 4;

DETAILED DESCRIPTION

FIG. 1 shows the basic construction of an electronically commutated direct current motor in accordance with an inner rotor design of the prior art. The motor includes a rotor assembly 6 and a stator assembly 8. The rotor assembly 6 features a rotor shaft 10 which bears a coil flux guide (back iron ring) 12 made of a soft magnetic material such as iron. A segmented or annular permanent magnet 14 is mounted on the coil flux guide or back iron 12. The shaft 10 is rotatably supported by bearings 16, 18. The rotor assembly 6, shown in FIG. 1 with the rotor shaft 10, the back iron 12 and the permanent magnet(s) 14, is located within the stator assembly 8, illustrated by a stator stack provided with windings 60 and consisting of a number of stator plates 55. The stator is connected to a flange 24, wherein the rotor assembly 6 is supported within the flange 24 by the bearing 18 and within an end cap 20 by the bearing 16. The flange 24 and the sealing cap 20 are connected to a motor housing 4. The flange 24 is also used to fix the DC motor to a chassis or suchlike by means of bores 32. FIG. 1 shows a DC motor with its basic elements in accordance with the prior art; it serves to explain the background to the invention.

FIGS. 2 and 4, which have already been described above, schematically illustrate a cross-section through an electric motor in accordance with the prior art. FIGS. 3 and 5 show the torque profiles generated by such electric motors.

Figure 6:
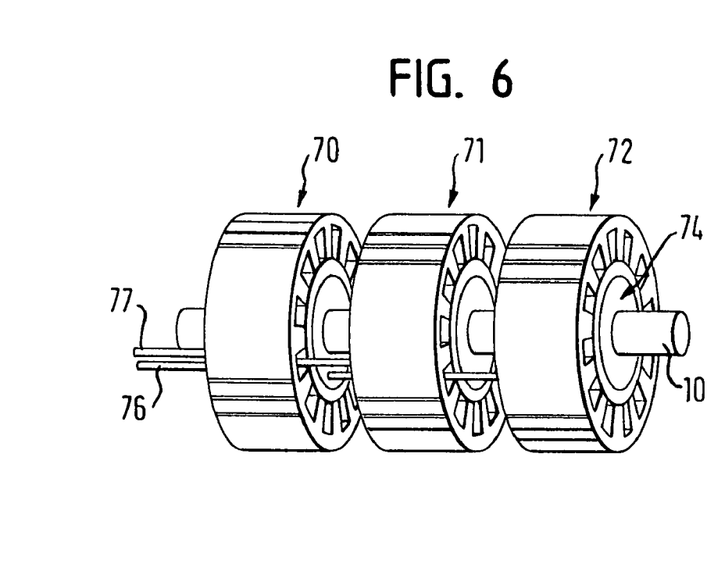
FIG. 6 is a schematic view of the DC motor according to the invention without housing, flanges and bearings.
Figure 7:
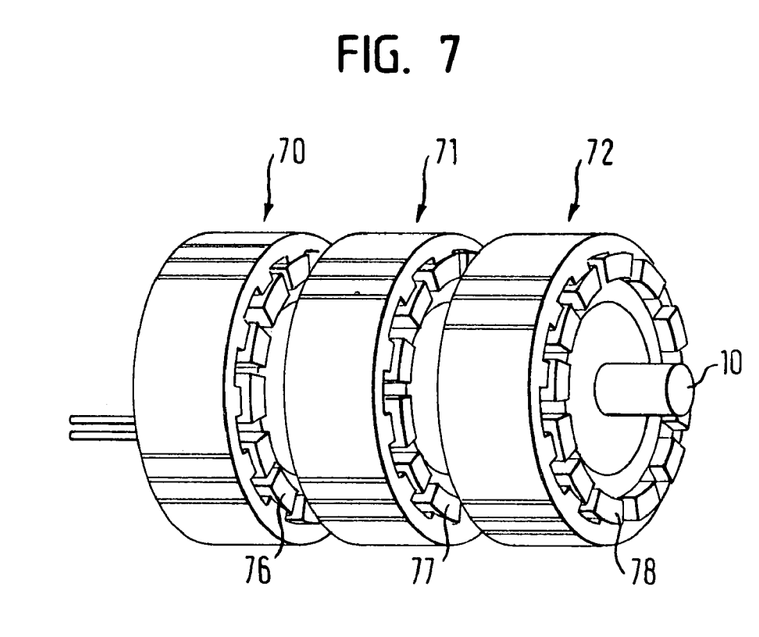
FIG. 7 is a schematic view of the DC motor, similar to the view of FIG. 6, but showing the windings for three phases.

FIG. 6 shows a schematic view of the DC motor of the invention having three axial stator sections 70, 71, 72, the rotor shaft 10 and a permanent magnet 74 being arranged within the stator sections 70, 71, 72. Permanent magnet 74 is also divided into axial sections resting on a coil flux guide or back iron ring. In this embodiment, the permanent magnet 74 can be divided into axial sections as shown in FIG. 6 or can extend along the entire axial length of the stator assembly. For purposes of clarity, the housing, flanges and bearings are not shown in FIG. 6; and phase windings 76, 77 are indicated schematically. FIG. 7 shows a view similar to FIG. 6 with an addition of windings 76, 77, 78 for three phases. In the embodiments of the inventive motor shown in FIGS. 6 and 7, the three stator sections 70, 71, 72 are arranged one behind the other in an axial direction of the electric motor and staggered around the rotational axis at a given angle to each other. The amount of offset depends on the number of magnetic poles and the amount of the desired torque profile overlap in the individual phases.

In a preferred embodiment of the invention, the number of slots in the individual stator sections 70, 71, 72 is equal to the number of magnetic poles of the associated permanent magnet 74. The amount of offset is chosen in such a way that the required overlap of the torque (shown in FIGS. 9 and 10)

is produced. In one embodiment, the stator sections are staggered by approximately N=180°/(number of phase windings) to each other.

Figure 8:
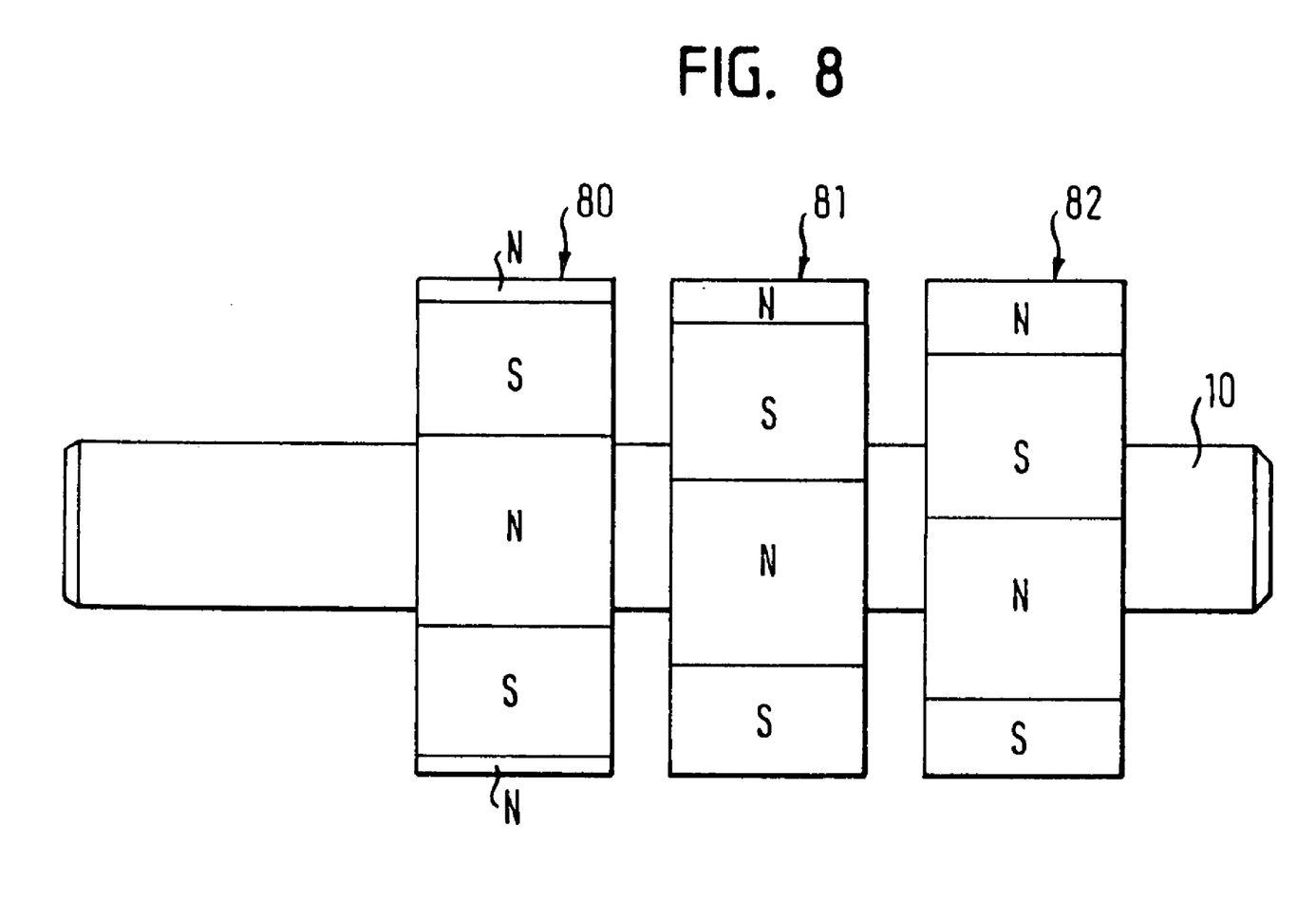
FIG. 8 is a rotor assembly of an alternative embodiment of the DC motor according to the invention.

FIG. 8 shows another embodiment of the invention. Only the rotor shaft 10 with the rotor magnets 80, 81, 82 are illustrated in FIG. 8. The rotor shaft 10 and the rotor magnets 80, 81, 82 form a rotor assembly that can be inserted into a stator assembly (not illustrated in FIG. 8) in accordance with the prior art. In the embodiment shown in FIG. 8, the rotor shaft 10 supports three axial permanent magnet sections 80, 81, 82, each of which features four magnetic pole pairs which are staggered with respect to each other. The rotor assembly shown in FIG. 8 can be combined with a stator unit shown in FIGS. 6 and 7, in accordance with the invention. In this last mentioned embodiment, either the axial magnetic sections 80, 81, 82, the axial stator sections 70, 71, 72 or both assemblies, can be staggered with respect to each other. The result of the arrangement of the axial stator sections or the axial rotor sections as presented in the invention is to influence the generated torque profile so that the torque curves of individual phases overlap in such a way that torque gaps are eliminated and torque ripple is reduced.

Figure 9:
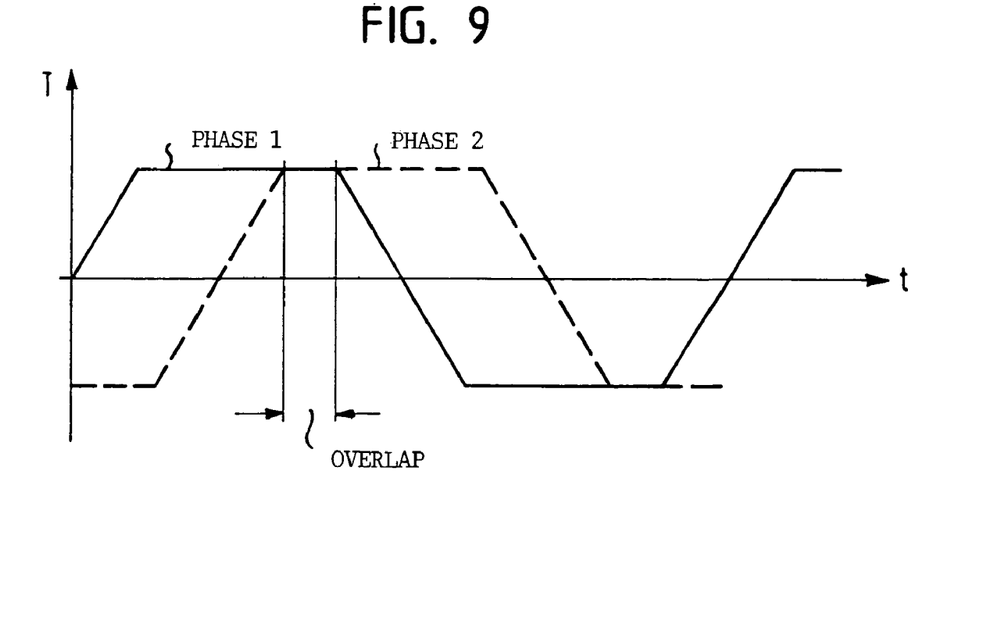
FIG. 9 is an example of a torque profile for a two-phase DC motor according to the invention.

FIG. 9 shows a torque profile for a two-phase DC motor according to the invention, wherein it is assumed that each axial stator section comprises four slots and the permanent magnet comprises two pole pairs. In the embodiment shown in FIG. 9, the stator sections and thus the associated phases are staggered in relation to each other in such a way that the torque profile of the individual phases overlap, in contrast to the torque profile of FIG. 3 corresponding to the prior art assembly. If the two-phase DC motor with the torque profile shown in FIG. 9 is controlled in such a way that the phases are switched in the region of the overlap this can result in a smooth torque profile, without torque break-down and without torque ripple being produced. If a sufficiently large overlapping region is provided during the motor's operation, the motor will also be immune to slight shifts in switching times. This applies to a two-phase DC motor in unipolar operation, i.e. when only one phase winding is energized. In bipolar operation, the motor's torque can be increased in that the torque in phase 1 and in phase 2 are added. In this case, torque ripple may still be generated, but a gap in the torque profile will not be produced.

As can be seen from FIG. 9, without appropriate phase switching of phase 1 and phase 2, a torque gap still occurs between the falling edge in phase 2 and the rising edge in phase 1. This gap can be closed by providing a third stator section or "stack" in a three-phase DC motor according to the invention.

Figure 10:
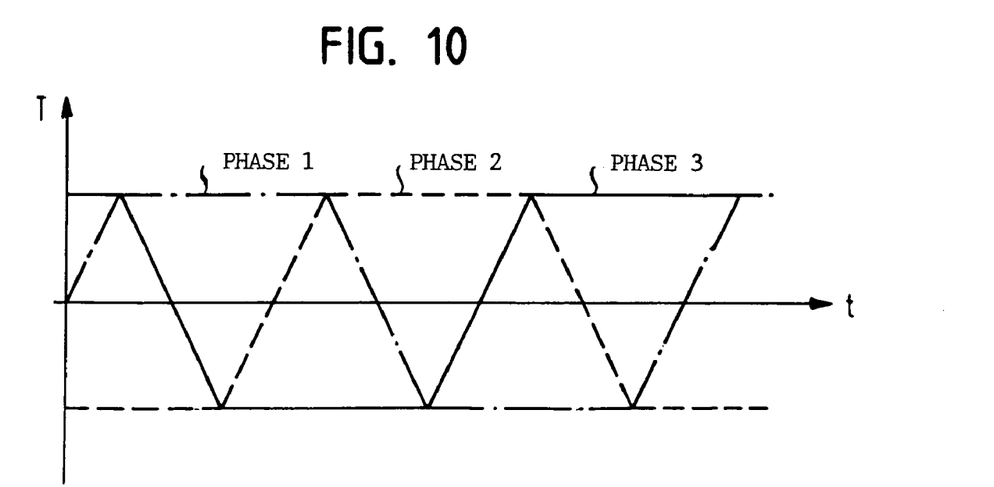
FIG. 10 is an example of a torque profile for a three-phase DC motor according to the invention.

FIG. 10 shows an example of a torque profile for a three-phase DC motor with three axial stator sections according to the invention. In this example, it is assumed that each stator section has six stator slots, and the permanent magnet has three magnetic pole pairs. The stator sections, each of which correspond to one phase, are staggered in relation to each other by 120°.

To generate the torque profile shown in FIG. 10, the individual stator sections and thus the phases are staggered by precisely 120° so that there is no overlap of the torque curves in the individual phases. As long as the switching instants to switch the individual phases are maintained exactly, a smooth torque profile is created without torque gaps and without torque ripple. It can, however, be seen from the illustration in FIG. 10 that if errors in the switching instants occur, slight torque ripple will be produced. Torque ripple could also occur in that the profile of the torque curves do not precisely correspond in practice to the illustration in FIG. 10. In practice, the rising and falling edges of the individual phases are less steep.

Figure 11:
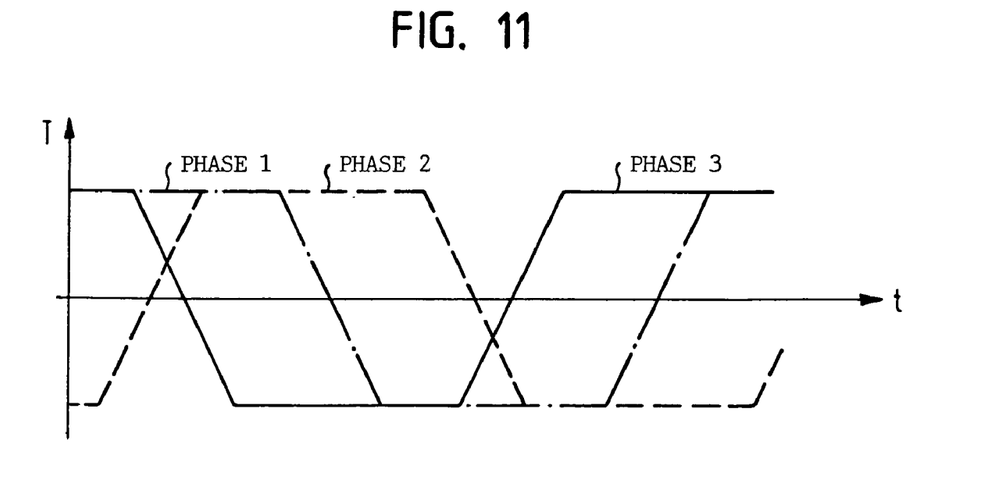
FIG. 11 is an example of a torque profile for a three-phase DC motor according to another embodiment of the invention.

This problem can be solved by staggering the individual axial stator sections and thus the phases by less than 120° so that an overlap of the torque curves is again produced. This is shown in FIG. 11. By properly controlling the phases in the three-phase DC motor and particularly by always switching the phases within the overlap region, a smooth torque profile without torque gaps can be generated. The overlap of the individual phases ensures that slight errors in the switching instant, i.e., when switching between the individual phases, do not affect the torque profile.

As shown in FIG. 11, a gap is created when the phases are shifted. The gap, however, can be evened out by proper control of the individual phase windings. In addition, this gap can also be closed by adding another phase.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

What is claimed is:

1. An electric motor comprising:
   a stator, said stator comprising a plurality of electrical stator poles and a plurality of phases including phase windings; and
   a rotor, said rotor comprising a permanent magnet with at least one magnetic pole pair corresponding to said phases;
   wherein said stator and said rotor are arranged concentrically to a longitudinal axis of the electric motor,
   wherein said stator is divided in the direction of the longitudinal axis of the electric motor into a number of axial stator sections corresponding to the number of phases, and wherein each axial stator section includes several electrical stator poles and the windings of one phase,
   wherein at least one of said phase windings and said permanent magnet are divided into several axial sections in the direction of the longitudinal axis of the electric motor, and
   wherein said axial sections are staggered around the longitudinal axis of the electric motor by approximately N°, said N°=180 electrical degrees÷(number of phases), so that the torque curves of the individual phases overlap each other.

2. The electric motor according to claim 1, wherein said stator is divided into two to three axial stator sections.

3. The electric motor according to claim 1, wherein said permanent magnet is divided in the direction of the longitudinal axis of the electric motor into a number of axial permanent magnet sections corresponding to the number of phase windings, and wherein each axial permanent magnet section has the same number of magnetic pole pairs.

4. The electric motor according to claim 3, wherein the permanent magnet is divided into two to three axial permanent magnet sections.

5. The electric motor according to claim 3, wherein said axial permanent magnet sections are staggered with respect to each other in such a way that negative and positive magnetic poles overlap.

6. The electric motor according to claim 1, wherein the number of electrical stator poles is equal to the number of magnetic poles.

7. The electric motor according to claim 1, wherein said axial stator sections having phase windings are arranged in the direction of the longitudinal axis of the electric motor with a space therebetween.

8. The electric motor according to claim 3, wherein the number of electrical stator poles is equal to the number of magnetic poles.

9. The electric motor according to claim 3, wherein said axial permanent magnet sections are arranged in the direction of the longitudinal axis of the electric motor with a space therebetween.

10. The electric motor according to claim 1, wherein the electric motor is an electronically commutated direct current motor.

* * * * *